US009005507B2

(12) United States Patent
Morello et al.

(10) Patent No.: US 9,005,507 B2
(45) Date of Patent: Apr. 14, 2015

(54) METHOD OF FORMING A FRONTAL TOOTHING ON AN INNER RING OF A WHEEL HUB

(75) Inventors: Enrico Morello, Roletto (TO) (IT); Fulvio Nicastri, Garzigliana (TO) (IT)

(73) Assignee: Aktiebolaget SKF, Gothenburg (SE)

(*) Notice: Subject to any disclaimer, the term of this patent is extended or adjusted under 35 U.S.C. 154(b) by 447 days.

(21) Appl. No.: 13/552,931

(22) Filed: Jul. 19, 2012

(65) Prior Publication Data
US 2013/0181376 A1 Jul. 18, 2013

(30) Foreign Application Priority Data

Jul. 29, 2011 (IT) .................................. TO11A0702

(51) Int. Cl.
B29D 99/00 (2010.01)
B21K 21/12 (2006.01)
B21K 25/00 (2006.01)
B21J 5/12 (2006.01)
B21J 9/02 (2006.01)
B21K 1/30 (2006.01)
B60B 27/00 (2006.01)

(52) U.S. Cl.
CPC ............ B29D 99/0032 (2013.01); B21K 21/12 (2013.01); B21K 25/00 (2013.01); B21J 5/12 (2013.01); B21J 9/025 (2013.01); B21K 1/30 (2013.01); B60B 27/0031 (2013.01); B60B 2900/113 (2013.01)

(58) Field of Classification Search
USPC .......................... 264/293, 294, 299; 403/274
See application file for complete search history.

(56) References Cited

U.S. PATENT DOCUMENTS

| 4,893,960 | A | 1/1990 | Beier et al. |
| 6,782,622 | B2 * | 8/2004 | Hagiwara et al. ........ 29/894.362 |
| 7,857,520 | B2 | 12/2010 | Langer et al. |
| 8,826,542 | B2 * | 9/2014 | Langer et al. ............. 29/898.06 |
| 2002/0172439 | A1 | 11/2002 | Webb |
| 2010/0275433 | A1 | 11/2010 | Diehl et al. |

FOREIGN PATENT DOCUMENTS

| EP | 1866553 B1 | 4/2009 |
| JP | 2011031682 A | 2/2011 |

* cited by examiner

Primary Examiner — James Sanders
(74) Attorney, Agent, or Firm — Bryan Peckjian; SKF USA Inc. Patent Dept.

(57) ABSTRACT

A method including the steps of forming an inner ring of a wheel hub, by joining a spindle and an insert ring fitted onto the spindle, on a side of a first end of the spindle; axially blocking the insert ring on the spindle by plastically deforming the first end of the spindle to form an upset collar therewith, which axially protrudes from the insert ring; and after forming the upset collar, frontally obtaining on the collar, on the side opposite to the insert ring a frontal toothing by means of a single creator tool provided, towards the collar, with a toothing which is complementary to that to be obtained, by impressing onto the collar, in sequence, one or more teeth of the complementary toothing, which have ridges with a rounded profile having a curvature radius (R) varying in the direction of an axis of symmetry (A1) of the tool.

7 Claims, 3 Drawing Sheets

METHOD OF FORMING A FRONTAL TOOTHING ON AN INNER RING OF A WHEEL HUB

CROSS-REFERENCE TO RELATED APPLICATION

This United States Non-Provisional Utility application claims the benefit of copending Italy Provisional Patent Application Serial No. TO2011A000702, filed on 29 Jul. 2011, which is incorporated herein in its entirety.

FIELD OF THE INVENTION

The present invention relates to a method of forming a frontal toothing on an inner ring of a wheel hub by means of plastic deformation. In particular, the present invention is applied to a wheel hub, the inner ring of which comprises a spindle, provided with a first rolling race for a first crown of rolling bodies, and an insert ring, provided with a second rolling track for a second crown of rolling bodies, wherein the insert ring is axially blocked onto the spindle by means of an upset collar, defined by an end section of the spindle which was plastically deformed.

BACKGROUND OF THE INVENTION

In the wheel hubs of the aforesaid type, the mentioned frontal toothing has the purpose of coupling head-to-head the inner ring of the wheel hub and a corresponding frontal toothing of an outer ring of a constant velocity joint, to ensure the torque transmission from the constant velocity joint to the inner ring of the wheel hub, which carries a wheel of the vehicle by means of a flanged end thereof. A coupling of this type is described in U.S. Pat. No. 4,893,960, which also teaches how to make the frontal toothing on the inner ring of the wheel hub. In particular, the frontal toothing is obtained using the so-called "orbital forming" method simultaneously with the forming of the upset collar by means of a tool including a truncated-cone-shaped element which upsets the collar and a frontally toothed tubular element, axially slidingly mounted on the truncated-cone-shaped element, which impresses the toothing onto the collar still during the step of deforming. A radially outer element of the toothed tubular element, which may either belong to the same tool or be a second separate tool, controls the radially outward deformation of the collar.

Although a forming method like that described in U.S. Pat. No. 4,893,960 is satisfactory, it requires the use of a relatively complex tool and especially does not provide toothings with features of absolute tooth profile constancy, which feature is absolutely necessary nowadays in view of the ever increasing transmitted torques.

It is thus the object of the present invention to provide a method of forming a frontal toothing on an inner ring of a wheel hub by means of plastic deformation, which is an alternative to the methods of the prior art, and in particular using a tool with a high constructional simplicity and simultaneously capable of ensuring a greater dimensional accuracy of the teeth and maintaining a high dimensional and geometrical constancy in the profile of the teeth themselves.

SUMMARY OF THE INVENTION

According to the present invention, a method of forming a frontal toothing on an inner ring of a wheel hub by means of plastic deformation is thus provided.

According to the invention, the frontal toothing is impressed by means of a single massive creator tool only, used to make the toothing and having a varying radius of the profile of the ridges of the teeth of the complementary toothing of the tool, surprisingly allows, although the tool is actuated according to the traditional orbital forming movement, to obtain frontal toothings by means of plastic deformation, in which the tooth profile is kept constant in a satisfactory manner, while ensuring a higher dimensional accuracy of the teeth thus obtained. Therefore, better and more accurate couplings are obtained between the inner ring of the wheel hub and the constant velocity joint, which allow more effective, quieter and higher capacity torque transmissions to be obtained.

Furthermore, the required frontal toothing is obtained with a lower energy consumption and the same orbital forming apparatus used to make the upset collar, simply by replacing the forming tool of the collar with the forming tool of the toothing, can be used to carry out the method of the invention.

BRIEF DESCRIPTION OF THE DRAWINGS

Further features and advantages of the present invention will become apparent from the following description of non-limitative embodiments, made with reference to the accompanying drawings, in which FIG. 1 diagrammatically shows in radial section a longitudinal elevation view of a wheel hub provided with a frontal toothing made according to the invention.

DETAILED DESCRIPTION OF THE INVENTION

Figure 1:
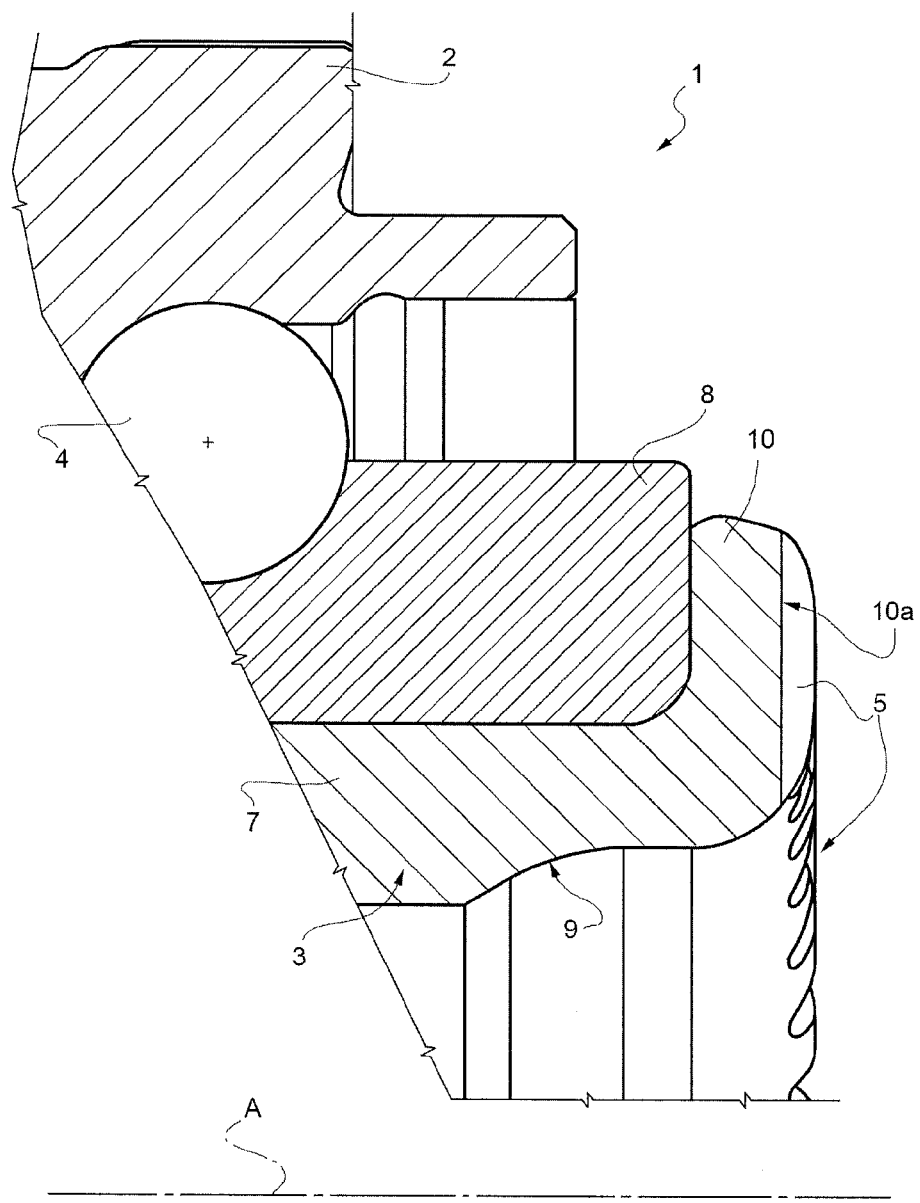

With reference to FIG. 1, numeral 1 indicates as a whole a wheel hub, known per se, comprising an outer ring 2, intended to be restrained in use to an upright of a vehicle suspension in a known manner, and an inner ring 3, between which two crowns of rolling bodies 4 are arranged (only one is shown in FIG. 1). The inner ring 3 can be operatively associated, in use, to a constant velocity joint (known and not shown for simplicity) by means of a frontal toothing 5 and is provided with holding means 6 defined by a flange (FIG. 2) for a vehicle wheel.

In particular, according to a known configuration, the inner ring 3 comprises a spindle 7, with which the flange 6 is integrally obtained in one piece, and an "insert" ring 8 fitted onto a terminal end 9 of the spindle 7 facing the opposite side of flange 6 and, in use, the mentioned constant velocity joint; inner ring 3, spindle 7 and ring 8 are reciprocally coaxial.

Ring 8 is axially blocked onto spindle 7 by means of an upset collar 10 obtained by means of plastic deformation of the terminal end 9; collar 10 axially protrudes from ring 8 and carries the frontal toothing 5 obtained on a terminal frontal face 10a (FIG. 1) thereof arranged substantially perpendicular to the axis of symmetry A (FIG. 2) of the wheel hub 1, in general, and of the inner ring 3, in particular.

Figure 2:
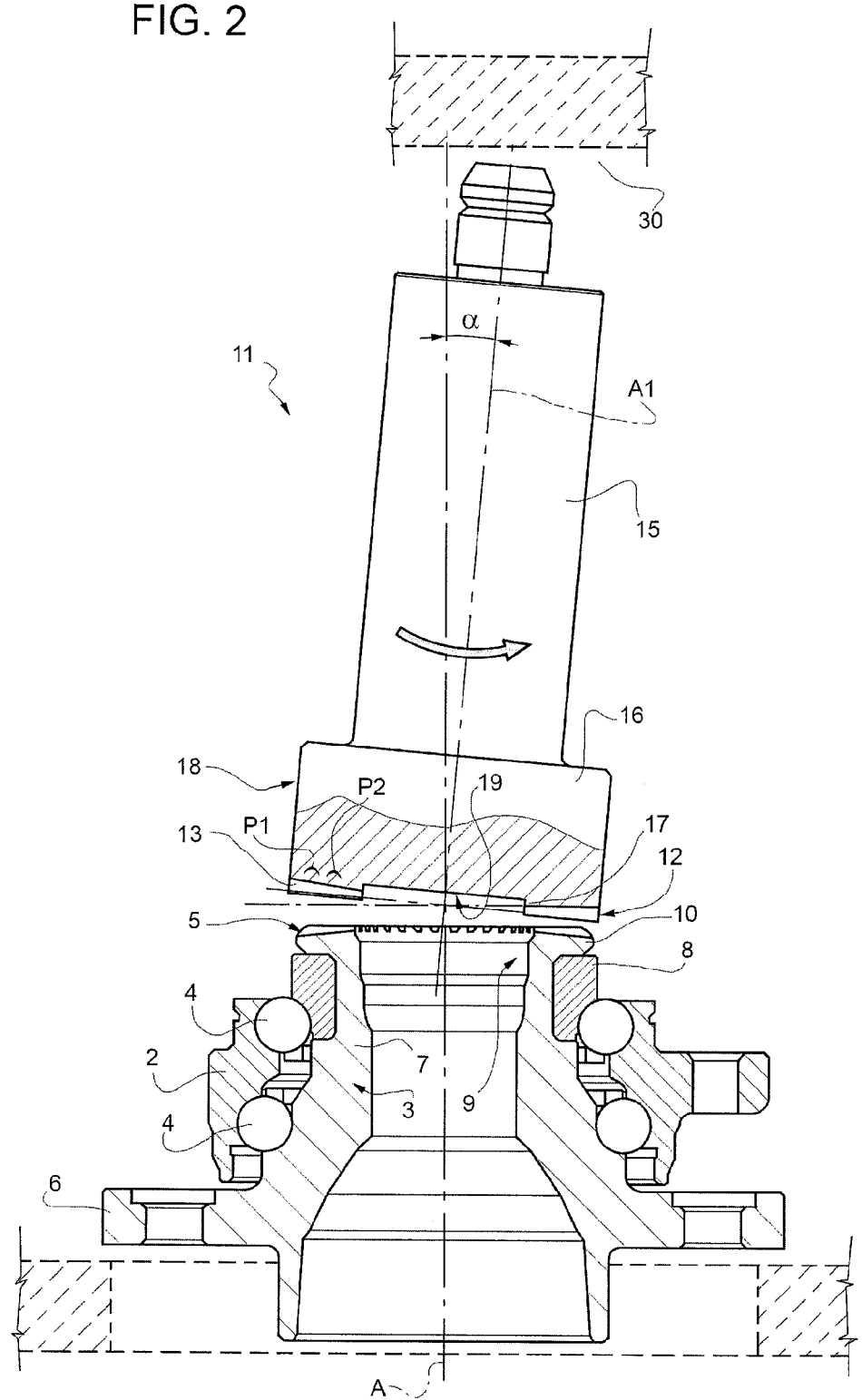
FIG. 2 shows on reduced scale the wheel hub in FIG. 1 during a step of the forming method according to the invention.

With reference now to FIG. 2, toothing 5 is obtained by means of a method which greatly differs from those known from the prior art.

In particular, the method of forming the toothing 5 by means of plastic deformation according to the invention comprises the steps of:

forming the inner ring 3 of the wheel hub 1 as the joining of a spindle 7 and ring 8, and then axially blocking ring 8 onto spindle 7 by forming collar 10 by means of plastic deformation of the end 9; this step is carried out in a known manner, e.g. using the so-called "orbital forming" process; and the step of frontally impressing the frontal toothing 5 onto collar 10, on the side opposite to ring 8.

However, according to the method of the present invention, the step of impressing the frontal toothing 5 onto collar 10 is carried out only after the true step of forming the upset collar 10, in sequence after the end of such a step of forming collar 10, directly onto the finished upset collar 10.

In combination with this selection of a particular sequence of steps, the step of impressing the frontal toothing 5 is carried out by means of a single creator tool 11 (FIG. 3) provided towards the collar 10 with a toothing 12 complementary to that to be obtained, consisting of a plurality of teeth 13 arranged according to a circular crown, symmetrically with respect to a first axis A1 defining the symmetry axis of tool 11.

According to an important aspect of the invention, the teeth 13 are shaped (FIG. 4) so as to be delimited at their top by respective ridges 14 which are shaped with a rounded profile having a curvature radius R varying in a radial direction with reference to the first axis A1.

Figure 4:
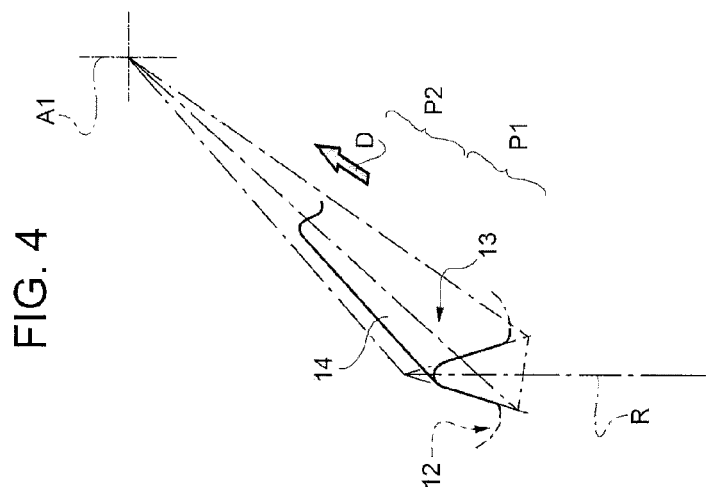
FIG. 4 diagrammatically shows on further enlarged scale a detail of a tooth of the tool in FIG. 3.

In particular, the ridges 14 of teeth 13 of the complementary toothing 12 have been shaped with a rounded profile having a curvature radius which gradually decreases towards axis A1, i.e. along the radial direction marked with D in FIG. 4. Even more in particular, ridges 14 have been shaped with a rounded profile, the curvature radius R of which linearly varies in a proportional manner to the distance of each profile point from axis A1, measured in the radial direction, i.e. which varies in a linear manner along direction D. According to an aspect of the invention, teeth 13 and tool 11 are dimensioned so that the ridges 14 have a proportionally varying radius profile R along the direction D, such that the curvature radius R goes to zero at the first axis A1.

According to another aspect of the invention, in combination with the feature described above (variability of the radius R along direction D), the step of impressing the frontal toothing 5 is carried out using a massive creator tool 11 (i.e. a solid tool, provided with a relatively high mass) comprising a shank 15 and a head 16, both being symmetric with respect to the first axis A1 defining the axis of symmetry of tool 11 and about which the tool 11 is rotated in use in the direction of the arrow (FIG. 2).

Head 16 consists of a full metal block, with a cylindrical shape in this case, provided towards the collar 10 with an annular, frontal projecting part 17 carrying the toothing 12 which is complementary to the toothing 5 to be obtained, and the shank 15 is also cylindrical in shape, but has a diameter such as to have dimensions smaller than the dimensions (diameter) of the head 16 in the direction transversal to the first axis (A1); during the step of impressing, which is diagrammatically shown in FIG. 2, the creator tool 11 is rotated while keeping the first axis A1 inclined with respect to the axis of symmetry A of the wheel hub, while being pushed against collar 10 in the direction of the first axis A1 (thus in an oblique direction with respect to collar 10), so as to sequentially impress on collar 10 one or more teeth 13 of the complementary toothing 12 to form the frontal toothing 5 on the collar, in a manner similar to the known "orbital forming" method.

The teeth 13 of the complementary toothing 12 are arranged in the radial direction with respect to the axis A1 along the whole radial width of the annular, frontal projecting part 17 so as to progressively taper in the circumferential direction, towards axis A1 (FIGS. 3 and 4); and the annular, frontal projecting part 17 is obtained from a peripherally outer edge 18 of the head and over a radial width smaller than that of the head 16, so as to centrally delimit a circular shallow recess 19 on the head 16, specifically on the side of the complementary toothing.

Furthermore, shank 15 is obtained so as to be coaxial with head 16 and to have larger dimension (diameter) than that (diameter) of the shallow recess 19 in the direction transversal to axis A1, so that the head 16 radially projects from shank 15 over a radially outer annular portion thereof only occupied by a peripherally outer part P1 (FIGS. 3 and 4) of the complementary toothing 12; while a remaining peripherally inner part P2 of the complementary toothing 12 remains within the transversal bulk of shank 15, thus aligned therewith.

Thereby, during the step of impressing as shown in FIG. 2, the outer annular part of head 16, which is arranged so as to protrude about the shank 15, which is also made as a solid metal element and preferably obtained in one piece with head 16, may elastically bend in an infinitesimal manner thus determining, along with the varying radius profile of the ridges 14 a much more accurate operation of forming toothing 5.

Figure 3:
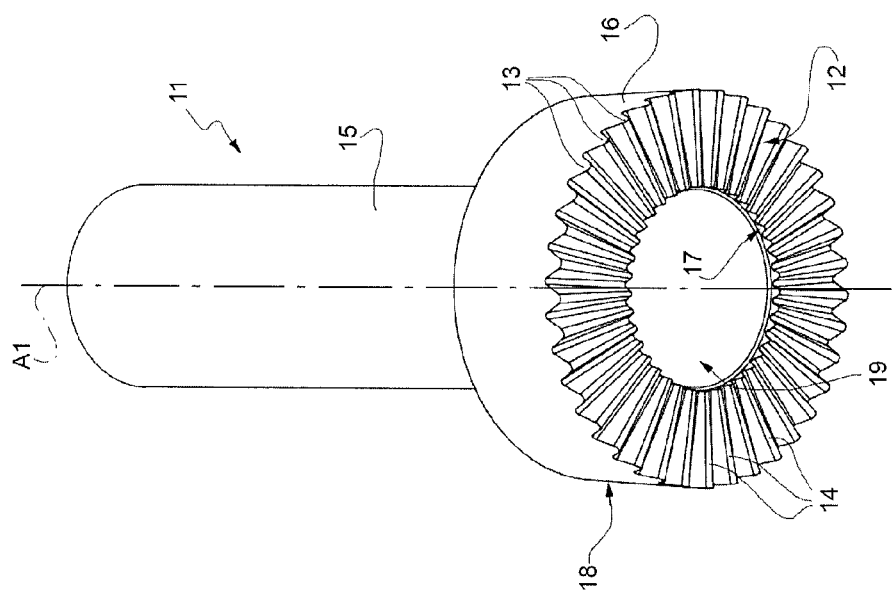
FIG. 3 shows an enlarged scale a perspective three-quarter lower view of a forming tool adapted to make the frontal toothing on the wheel hub in FIG. 1 according to the method of the invention.

According to another aspect of the invention, the first axis A1 is oriented during the step of impressing in FIG. 3 so as to have, with respect to the axis of symmetry A of the wheel hub 1, an inclination a (shown off-scale in FIG. 2) between 2° and 7° and so as to intercept the axis of symmetry A of the wheel hub 1 substantially at the frontal end face 10a of the collar 10.

Finally, in order to ensure a correct ratio between rigidity and flexibility of the structure of the tool 11 as a whole, the metal block which forms the head 16 of the creator tool 11 has, in the axial direction and measured along the first axis A1, a thickness equal to about twice the extension in the radial direction of the annular, frontal projection part 17.

An apparatus 30 only diagrammatically shown with a dashed line in FIG. 2 as it is known and which is the same previously used to obtain the collar 10 by means of orbital forming, is used to push the creator tool 11 against collar 10.

We claim:

1. A method of forming, by means of plastic deformation, a frontal toothing on an inner ring of a wheel hub, comprising the steps of:

forming the inner ring of the wheel hub by joining a spindle and an insert ring fitted onto the spindle, on a first side of a first end of the spindle;

axially blocking the ring onto the spindle by plastically deforming the first end of the spindle so as to form an upset collar therewith, which axially protrudes from the ring; and frontally impressing the frontal toothing onto the collar, on a side opposite to the ring; and wherein the step of impressing the frontal toothing onto the collar is carried out only after the step of forming the upset collar, sequentially after the end of the step of forming the collar, directly on the finished upset collar; and wherein the step of impressing the frontal toothing is carried out by means of a single, creator tool provided, towards the collar, with a toothing which is complementary to that to be obtained, consisting of a plurality of teeth radially arranged according to a circular crown, symmetrically with respect to a first axis (A1) defining the axis of symmetry of the tool, the teeth having been shaped so as to be delimited at the top by respective ridges which have been shaped with a rounded profile having a curvature radius (R) varying in radial direction (D) with respect to the first axis;

the step of impressing the frontal toothing being carried out by using a massive creator tool comprising a shank and a head, both being symmetric with respect to the first axis (A1) defining the axis of symmetry of the tool and about which the tool is rotated, the head consisting of a full metal block, provided towards the collar with an annular, frontal projecting part carrying the toothing which is complementary to that to be obtained; and the shank being made so as to be, in the direction transversal to the first axis (A1), smaller than the head (16); and wherein during the step of impressing, the creator tool being rotated while keeping the first axis (A1) inclined with respect to an axis of symmetry (A) of the wheel hub, while being pushed against the collar in the direction of the first axis (A1), so as to sequentially impress on the collar one or more teeth of the complementary toothing to form the frontal toothing on the collar;

wherein the teeth of the complementary toothing are arranged in the radial direction with respect to the first axis (A1) along the whole radial width of the annular, frontal projecting part so as to progressively taper in the circumferential direction, towards the first axis, and wherein the annular, frontal projecting part being obtained starting from a peripherally outer edge of the head and up to a radial width smaller than the head, so as to centrally delimit a circular shallow recess on the head, specifically on the side of the complementary toothing.

2. The method according to claim 1, wherein the ridges of the teeth of the complementary toothing are shaped with a rounded profile having a curvature radius (R) which gradually decreases towards the first axis (A1).

3. The method according to claim 1, wherein the ridges of the teeth of the complementary toothing are shaped with a rounded profile, the curvature radius (R) of which linearly varies in a proportional manner to the distance of each profile point from the first axis (A1), measured in the radial direction (D).

4. The method according to claim 3, wherein the ridges are shaped by a profile the curvature radius (R) of which goes to zero at the first axis (A1).

5. The method according to claim 1, wherein the shank is obtained so as to be coaxial with the head and so as to be larger than the shallow recess in the transversal direction with respect to the first axis (A1), so that the head radially projects in order to protrude from the shank with a radially outer annular portion occupied only by a peripherally outer part (P1) of the complementary toothing; while a remaining peripherally inner part (P2) of the complementary toothing remains within a transversal bulk of the shank.

6. The method according to claim 1, wherein the first axis (A1) is oriented during the step of impressing so as to have, with respect to the axis of symmetry (A) of the wheel hub, an inclination between 2° and 7° and so as to intercept the axis of symmetry (A) of the wheel hub substantially at a frontal end face of the collar.

7. The method according to claim 1, wherein the metal block forming the head of the creator tool has, in the axial direction measured along the first axis (A1), a thickness equal to about twice the extension in the radial direction of the annular, frontal projecting part.

\* \* \* \* \*